United States Patent [19]

Curcio

[11] 4,382,308

[45] May 10, 1983

[54] SCRUBBING TORQUE MONITORING AND CONTROL SYSTEM

[75] Inventor: Joseph J. Curcio, State College, Pa.

[73] Assignee: Chemcut Corporation, State College, Pa.

[21] Appl. No.: 235,512

[22] Filed: Feb. 18, 1981

[51] Int. Cl.³ .......................................... A46B 13/02
[52] U.S. Cl. .................................... 15/77; 15/21 D; 318/39
[58] Field of Search ............. 15/21 E, 77, 102, 21 D, 15/53 A, 53 AB; 51/165.9, 165.91, 165.92, 165.8; 318/39

[56] References Cited

U.S. PATENT DOCUMENTS

| | | | |
|---|---|---|---|
| 3,662,418 | 5/1972 | Kamiya | 15/53 A |
| 3,748,789 | 7/1973 | Wada | 51/165.9 |
| 3,795,931 | 3/1974 | Martino | 15/77 |
| 3,819,991 | 6/1974 | Weigele et al. | 318/39 |
| 4,052,648 | 10/1977 | Nola. | |
| 4,137,677 | 2/1979 | Nedreski | 51/165.92 |
| 4,249,113 | 2/1981 | Werner | 318/39 |

FOREIGN PATENT DOCUMENTS

| | | |
|---|---|---|
| 371019 | 4/1932 | United Kingdom. |
| 1141947 | 2/1969 | United Kingdom. |
| 1384710 | 2/1975 | United Kingdom. |

Primary Examiner—Edward L. Roberts
Attorney, Agent, or Firm—Paul & Paul

[57] ABSTRACT

An electronic circuit measures the torque of a motor used to drive rotatable brushes, which may be used to clean the surfaces of flat articles, such as printed circuit boards. The circuit measures the torque by determining the average power consumed by the motor. The measured torque provides the operator of the system with an indication as to whether the brushes are spaced for proper impingement upon the article being scrubbed. The invention also comprises a servomechanism which provides for automatic and continuous readjustment of the position of the brushes, relative to the flat articles, in accordance with changing motor load conditions. The invention may be used to regulate the torque of a motor which is used in many other applications.

20 Claims, 5 Drawing Figures

SCRUBBING TORQUE MONITORING AND CONTROL SYSTEM

BACKGROUND OF THE INVENTION

This invention pertains to the manufacture of flat articles, such as printed circuit boards, and the like. In manufacturing printed circuit boards, various chemicals are used to produce the desired circuit. Before certain processing steps have been performed, it is necessary to clean the boards to remove excess chemicals (such as copper oxides) or othe substances. It is also necessary to remove dirt which may have accumulated on the circuit board during prior processing.

In the prior art, it has been known to scrub the printed circuit board with a rotating brush positioned above or below the plane of the board. The flat board may thus be scrubbed while traveling through the manufacturing apparatus. An example of a brush used for this purpose is shown in U.S. Pat. No. 3,795,931 to Martino. The brush is typically driven by an ac induction motor.

In using brushes of the type described in the above-cited patent, it is important that the brush be the proper distance from the printed circuit board (or other flat article). If the brush impinges upon or engages the board with too much force, the bristles of the brush may damage the board. Since the material to be scrubbed and removed from the board is usually very thin, sometimes of the order of thousandths of an inch, it is therefore easy to scrape or score the board by application of too much brush pressure. On the other hand, if the brush is not so located to impinge upon the board sufficiently, the board will not be adequately cleaned. Therefore, the brush must be maintained at a certain optimum location relative to the board.

In the prior art, it has also been necessary to brush the surface of a board through which holes have been drilled, in order to eliminate the burrs left after drilling. The same considerations which apply to scrubbing apply also to deburring.

It is understood that the terms "brushes," as used herein, refers, inter alia, to scrubbing or deburring brushes, and the like, and wiping and brushing means of various constructions, and not to "brushes" as used in the dc motor art. It is further understood that the term "brushing" is used to include, inter alia, such mechanical operations as scrubbing and deburring, as described above.

In the prior art, as represented by the above-cited patent, the proper setting of the distance of the brush relative to the board was determined by monitoring the current through the brushing drive motor. Elementary electrodynamics teaches that the torque generated by the motor is directly proportional to the current through the windings (torque being proportional to magnetic moment, which is itself proportional to the current through the coil). Thus, in the past, the current was taken as an indication of the loading on the motor. If the motor showed signs of overloading, the motor shaft would be moved farther away from the board so that the brushes would be moved to impinge less upon the board, and vice versa. However, it has been found that the use of the motor current as an indication of motor torque is not satisfactory. In an ac induction motor, there are both resistive and reactive effects, and it is well known that only the resistive component accounts for actual power consumption.

The total current supplied to an induction motor can be divided into resistive and reactive components. In a totally resistive current demand, all current is converted into energy, whereas in a reactive current demand, all energy supplied to the system is returned at some time later to the generator. Therefore, with a purely reactive load, no energy is consumed. Thus, in an electric induction motor, the resistive component is totally responsible for energy delivered to the shaft.

The present invention provides a brushing means for flat articles, such as printed circuit boards, in combination with electronic circuitry which more accurately measures the motor torque, so that the proper impingement of the brushes upon the printed circuit board (or other flat article) can be more reliably determined. The invention also discloses a servomechanism which enables the spacing of the brushes to be continuously and automatically maintained.

SUMMARY OF THE INVENTION

The present invention comprises at least one rotatable brush, positioned to abut a flat article, such as a printed circuit board which is being conveyed through the apparatus. The rotatable brush is easily movable for greater or less impingement upon the board. The brush is powered by an induction motor. The voltage across the motor and the current through the motor are sampled, and multiplied together by an electronic circuit, comprising a differential amplifier in a variable gain configuration. The output of the multiplying circuit is coupled, through appropriate isolation means, to an integrating circuit, which provides an output representing the average power consumed by the brush drive motor, and hence the torque of the motor. The circuit includes a meter for indicating the torque. The circuit also includes a provision for signaling an alarm when the torque of the motor exceeds a predetermined value. The invention further comprises a servomechanism, whereby the output of the integrator is used to generate a correction signal, which in turn is used to control the position of the brush relative to the printed circuit board.

Accordingly, it is a primary object of the present invention to provide an apparatus for brushing printed circuit boards and the like which apparatus includes means for determining the actual torque delivered by the scrubbing motor.

It is a further object of the present invention to provide an apparatus as described above, wherein the electronic circuitry includes means for signaling the attainment of a predetermined torque.

It is a further object of the present invention to provide a system as described above, wherein the position of the brushing means relative to the printed circuit board is continuously and automatically controlled by a signal from the electronic circuitry.

It is a further object of the present invention to provide a system as described above, wherein the high voltage used to drive the brushing motor is effectively isolated from the system controls handled by the operator.

It is a further object of the invention to provide an electronic circuit, for use in a printed circuit board brushing system, which circuit is capable of determining the torque delivered by the brushing motor.

It is a further object of the invention to provide an apparatus which can accurately monitor the torque delivered by an ac motor under varying load conditions, and which can adjust the load conditions to maintain a desired torque.

Other objects and advantages of the present invention will be apparent to those skilled in the art from a reading of the following brief description of the drawings, the detailed description of the invention, and the appended claims.

DETAILED DESCRIPTION OF THE INVENTION

Figure 1:
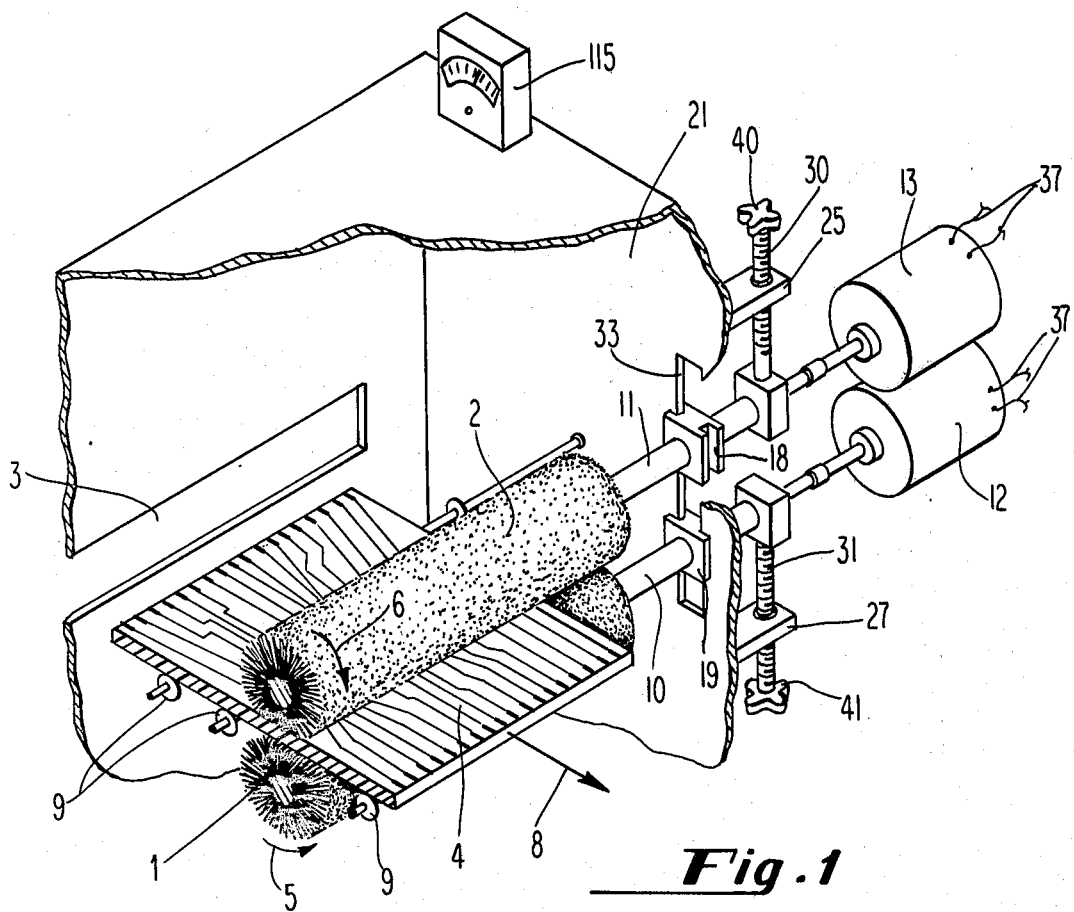
FIG. 1 is a perspective view (with portions shown in cut away cross section) of a portion of the brushing module, the scrubbing brushes thereof being used to clean a printed circuit board.

FIG. 1 shows a perspective view, with portions shown in cut-away cross section, of a portion of a brushing module, of the scrubbing-brush type, showing the scrubbing brushes thereof engaging a printed circuit board. While the description speaks mainly of scrubbing brushes, it is understood that, with minor modifications, the module shown could be used as a deburring module, or as a module for performing a similar task. Brushes 1 and 2 are shown positioned above and below printed circuit board 4. Brushes 1 and 2 rotate in the directions indicated by arrows 5 and 6, respectively. Printed circuit board 4 is transported, in the direction of arrow 8, by conveyor wheels such as those designated by the reference numeral 9. A slot 3 in housing 21 enables the board 4 to pass through the apparatus. It is understood that although two scrubbing brushes are shown, the number of brushes used can be varied. Indeed, a single brush could be used, positioned either above or below the circuit board, if desired. Also, it is understood that, while the invention is described with respect to printed circuit boards, such as shown in the drawing, the invention is applicable to the processing of any other flat articles which need to be brushed, but which also have surfaces which would be easily damaged by excessive brush pressure.

It is also understood that the apparatus described is part of an overall system for etching printed circuit boards and the like. The system is of modular design, of the type described in U.S. Pat. No. 4,015,706 to Goffredo et al. FIG. 1 shows, therefore, the scrubbing module of such a system. This module has a housing 21, the housing having inlet and outlet slots to allow the printed circuit board, or other article, to pass through.

Brushes 1 and 2 are mounted on shafts 10 and 11, respectively, and these shafts are rotated by brush drive motors 12 and 13, which motors are of the ac induction type. The shafts are mounted through brackets 18 and 19 which are attached to housing 21.

Also mounted to the housing 21 are brackets 25 and 27 which receive threaded bars 30 and 31 respectively.

Threaded bars 30 and 31, when rotated by handles 40 and 41, respectively, cause the respective scrubbing brushes to move towards or away from the circuit board, since brackets 18 and 19 are slidable along the edges of slot 33 of housing 21.

Mounted on housing 21 is meter 115 which indicates to the operator the torque delivered by either motor. Power is supplied to the motors through leads 37.

As stated above, in order to obtain a measurement of motor torque, it is necessary to determine, by appropriate electronic circuitry, the average power consumed by the motor. Before describing the specific electronic circuits, it is helpful to review the underlying electrical theory. Assume that the voltage, E, across the motor, is given by $$E = E_m \cos \omega t \quad (1)$$

and that the current through the motor is given by $$I = I_m \cos(\omega t + \theta) \quad (2)$$

where $E_m$ and $I_m$ represent the maximum voltage and current respectively, $\omega$ represents the angular frequency of the current, and $\theta$ represents the phase angle between the voltage and current.

Since it is elementary that power is the product of voltage and current, it follows that the power is given by $$P = E_m I_m \cos \omega t \cos(\omega t + \theta). \quad (3)$$

After simplification of Equation (3), using appropriate trigonometric identities, one obtains $$P = E_m I_m (\cos(2\omega t + \theta) + \cos \theta). \quad (4)$$

The average power consumed by the motor is obtained by integrating Equation (4) over one period. We obtain $$\int_0^{2\pi/\omega} P \, dt = \frac{\pi E_m}{\omega} (I_m \cos \theta) \quad (5)$$

Equation (5) has been written in a manner that emphasizes that the average power consumed is proportional to $I_m \cos \theta$, which is simply the resistive current component. In other words, the above derivation shows that a physical measurement of the average power consumed by the motor automatically takes into account the resistive and reactive effects, and only counts the resistive current in the overall power consumed. From Equation (5), it is clear that if the phase angle is 90° (i.e. a totally reactive current) there is no power consumed. On the other hand, if the phase angle is zero, all of the current is resistive, and the power consumed is maximized.

As stated above, motor torque is directly proportional to the magnetic moment of the windings. This magnetic moment depends linearly on the (resistive) current in the windings, and Equation (5) shows a linear relation between resistive current and average power. Thus a meter which indicates average power will fluctuate linearly with motor torque.

Figure 2:
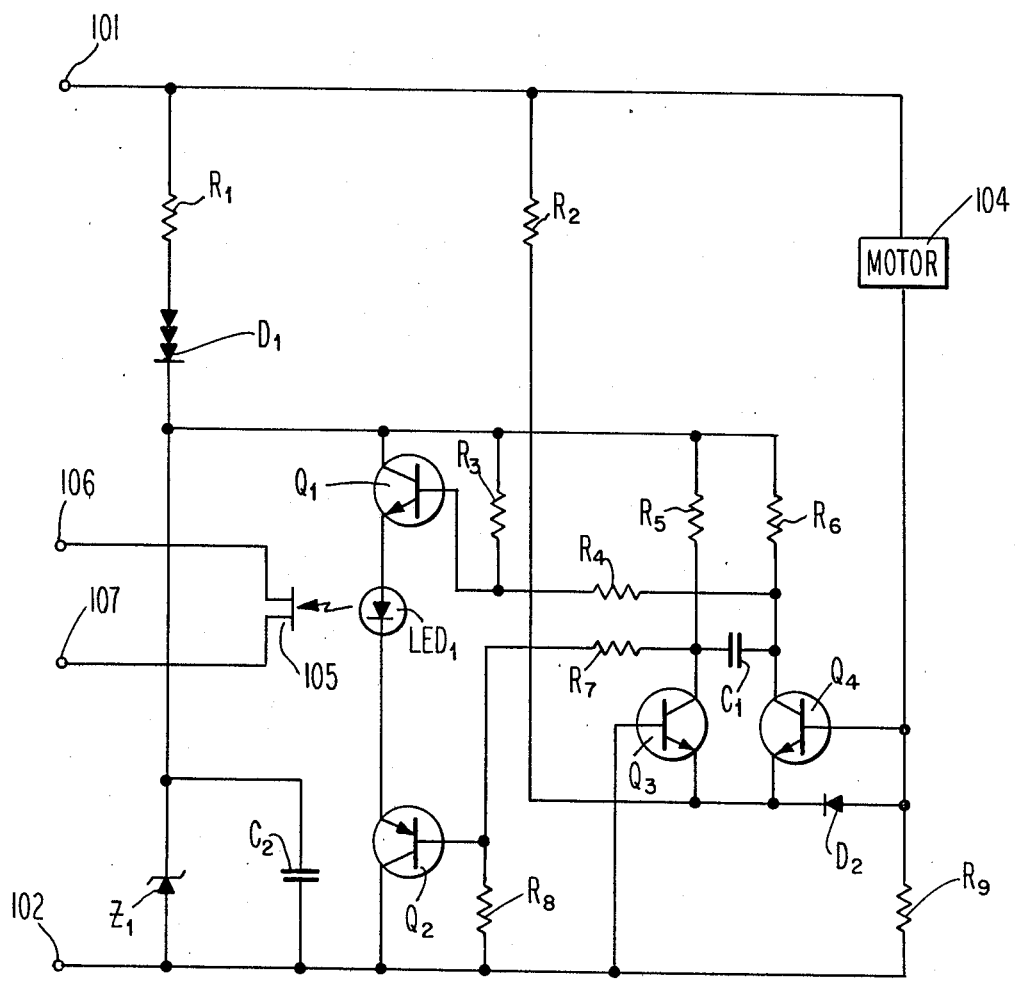
FIG. 2 is a schematic circuit diagram of the circuit used to multiply current and voltage together.
Figure 3:
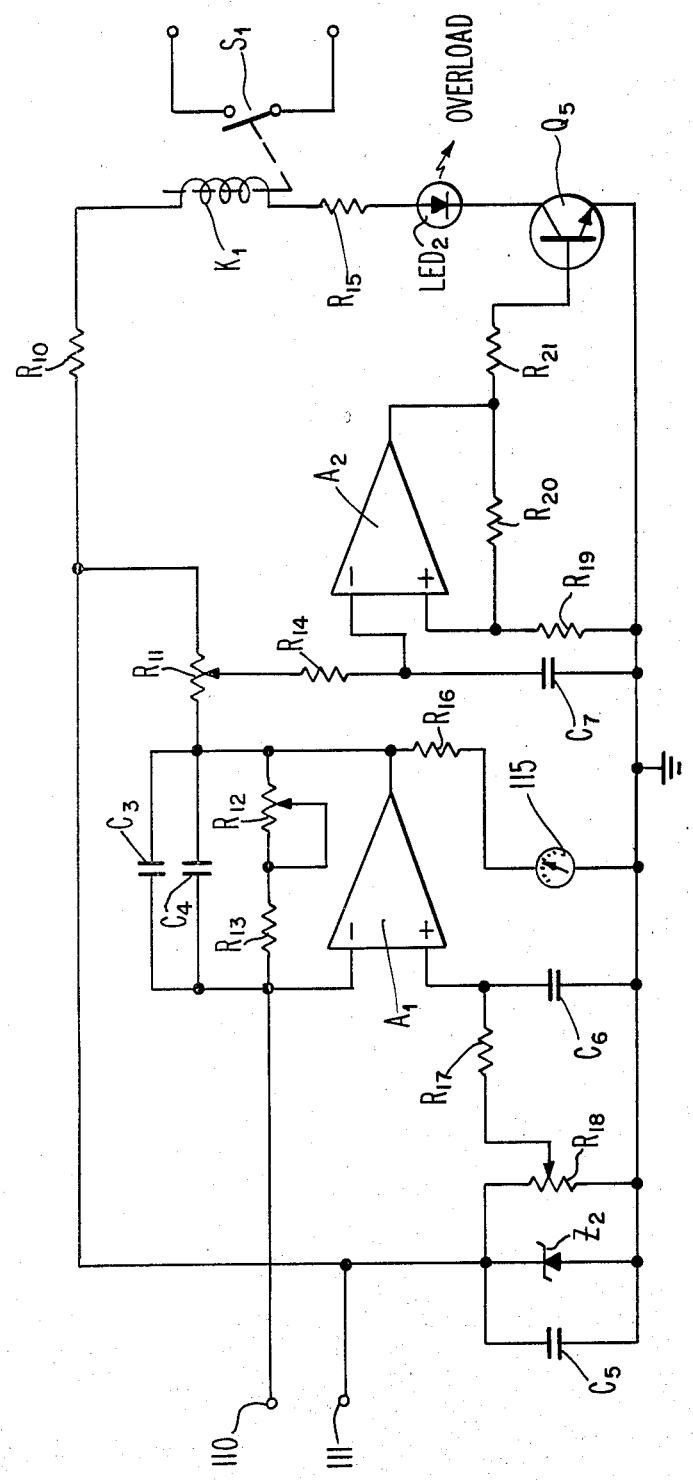
FIG. 3 is a schematic circuit diagram of an integrating circuit, also comprising a circuit for signaling the attainment of a given torque.
Figure 4:
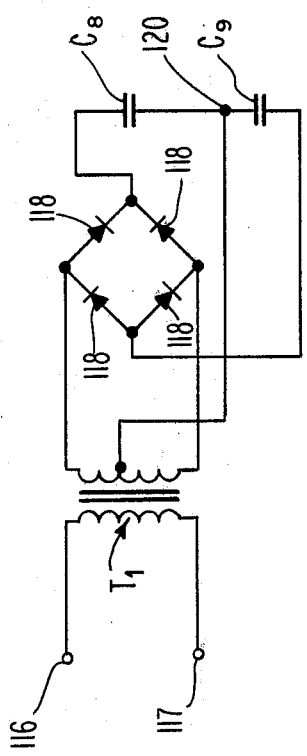
FIG. 4 is a schematic circuit diagram of the power supply used to power the circuit of FIG. 3.

The circuits for implementing the above computations are shown in FIGS. 2-4. FIG. 2 is a schematic circuit diagram of that part of the circuit which multiplies the motor voltage by the motor current. The potential for driving the scrubbing brush motor is applied at terminals 101 and 102, this voltage being in the range of about 100–480 volts (alternating current). It is seen that motor 104, which drives the scrubbing brush, is connected across this source of electric power. The multiplying circuit takes its operating power from the main power source of motor 104, the electric current being rectified by diodes $D_1$. Voltage regulation is provided by zener diode $Z_1$.

Transistors $Q_3$ and $Q_4$ together constitute a differential amplifier that is operated in a variable gain configuration. That is, the inputs to the differential amplifier come from both the voltage across the motor, as represented by the voltage across $R_2$, as well as the current through the motor, which flows through sensing resistor $R_9$. It is the motor voltage signal from $R_2$, which modulates the gain of $Q_3$ and $Q_4$, causing the multiplying to occur. The output of $Q_3$ and $Q_4$ is further amplified by transistor pair $Q_1$ and $Q_2$, and this output causes light emitting diode $LED_1$ to emit light, its luminosity being proportional to the output level. The light emitting diode is located in close proximity to field effect transistor 105, such that the brighter the light from the light emitting diode, the greater the output of field effect transistor 105. The output of field effect transistor 105 appears across terminals 106 and 107.

The multiplying circuit shown in FIG. 2 is immediately followed by that shown in FIG. 3. The terminals 106 and 107 of FIG. 2 are connected directly to terminals 110 and 111, respectively, of FIG. 3. The output from the multiplying circuit of FIG. 2 is directed to the input of operational amplifier $A_1$ which is configured as an integrator, to integrate the multiplied current and voltage from the motor. The output of this integrating circuit is visually determined by observing the reading on meter 115 which is preferably of the type having a range of 0–1 mA. By observing the reading on this meter, the operator can determine the average power consumed by the motor, and therefore the torque delivered by the motor. The operator can thus adjust the position of the scrubbing brushes to provide the proper amount of contact with the printed circuit board.

Variable resistor $R_{18}$ provides a zero adjustment for the integrating circuit. The circuit is adjusted such that, at under conditions of no lead on the motor, the meter 115 will indicate a zero reading. Variable resistor $R_{12}$ is a sensitivity adjustment. That is, a change in the value of $R_{12}$ will change the amount of meter deflection due to a given change in motor torque.

The circuit of FIG. 3 also provides a means for indicating the attainment of a predetermined motor torque. Operational amplifier $A_2$ is configured as a Schmitt trigger circuit. When a predetermined output from operational amplifier $A_1$ is detected (the critical point being determined by the setting of variable resistor $R_{11}$), the Schmitt trigger actuates both relay $K_1$ and light emitting diode $LED_2$. Relay $K_1$ is shown to actuate switch $S_1$, which could be used to interrupt power to the brush drive motor, or to sound an alarm. Light emitting diode $LED_2$ provides a visual warning of a condition of excessive torque. Transistor $Q_5$ serves as an amplifier to allow both the relay and the light emitting diode to be used together. Of course, it is not necessary to use both relay and LED in the circuit.

The Schmitt trigger assures that, during conditions when the torque is very close to the critical point, that the warning will be clear and unambiguous, and will not turn on and off intermittently. That is, by using positive feedback through $R_{20}$, the operational amplifier $A_2$ does not emit a signal until slightly after the critical point has been reached, and once the signal is present, the amplifier $A_2$ does not turn off until the integrator output drops slightly below the critical point.

The power supply for the integrating circuit of FIG. 3 as well as the Schmitt trigger and relay, is shown in FIG. 4. Terminals 116 and 117 are connected to a source of ordinary house current (i.e. about 110 volts ac) and the transformed voltage is rectified by diodes 118, connected as a full-wave bridge rectifier, and filtered by capacitors $C_8$ and $C_9$ to provide voltages of $+7$ and $-7$ volts DC, with terminal 120 representing a point of zero potential. The output from the power supply of FIG. 4 is connected to the appropriate terminals on operational amplifiers $A_1$ and $A_2$ of FIG. 3. These terminals are not shown in the drawing, but it is understood that such terminals are clearly marked on operational amplifiers which are commercially available. The voltages supplied to the circuit of FIG. 3 are further regulated by zener diode $Z_2$. Capacitor $C_5$ functions as a noise filter for the zener diode.

In the circuits described, the components can have values as shown as follows (resistances being in ohms, and capacitances being in microfarads):

| | |
|---|---|
| $R_3$ 270K | $R_{12}$ 100K (maximum) |
| $R_4$ 49.9K | $R_{13}$ 47K |
| $R_5$ 10K | $R_{14}$ 10K |
| $R_6$ 10K | $R_{15}$ 100 |
| $R_7$ 49.9K | $R_{16}$ 1K |
| $R_8$ 270K | $R_{17}$ 100K |
| $R_9$ (see below) | $R_{18}$ 10K (maximum) |
| $R_{10}$ 470 | $R_{19}$ 1K |
| $R_{11}$ 100K (maximum) | $R_{20}$ 100K |
| | $R_{21}$ 4.7K |
| $C_1$ .47 | $C_6$ .47 |
| $C_2$ 100 | $C_7$ 5 |
| $C_3$ .47 | $C_8$ 250 |
| $C_4$ .47 | $C_9$ 250 |
| $C_5$ 5 | |

The value of $R_9$, the current sensing resistor, is determined on the basis of the approximate current range expected in the motor, and on the assumption that there should be a voltage drop across this resistor of about 100 mV. Of course, these values are not critical, as long as the resistances and capacitances stay in roughly the same proportions.

The values of $R_1$ and $R_2$ depend upon the voltage used to power the motor. If the voltage is in the 200-volt range, $R_1$ is about 12 K and $R_2$ is about 44 K. if the voltage is in the 440-volt range, $R_1$ should be about 20 K and $R_2$ should be about 94 K.

It is important to note that separate power supplies are used for the circuits of FIG. 2 and FIG. 3. As noted above, the multiplying circuit of FIG. 2 receives its power directly from the line which powers the brush drive motor, and this voltage can be as high as 480 volts, at 50 amperes. Such a voltage and current can be dangerous to humans, and can also damage sensitive semiconductor circuits. For these reasons, the high-voltage is isolated from the circuit of FIG. 3 (which contains the controls handled by the operator), both by the use of LED, with field effect transistor 105, and by the use of a separate power supply for the circuit of FIG. 3. This power supply, shown in FIG. 4, is connected only to ordinary household voltages. Thus the operator of the system is isolated from high voltages associated with the brush drive motor.

The operation of the system, as it has been described until this point, is as follows. The necessary adjustments are made to $R_{18}$ such that the meter 115 indicates a zero reading under no load conditions. The variable resistors $R_{12}$ and $R_{11}$ are also adjusted to provide the desired sensitivity and overload alarm points respectively. The operator turns on the brush drive motors, and observes the position of the needle on meter 115. The meter reading is compared with the reading which has been found, from prior experience, to indicate the proper motor torque. If the meter indicates a higher value, the operator moves the scrubbing brushes away from the printed circuit board, by turning handles 40 and 41. This operation reduces the torque delivered by the motor, and the needle on meter 115 returns to the desired position. If the needle on meter 115 falls below the desired reading, the operator adjusts the position of the brushes such that the brushes are moved closer to the printed circuit board, thereby increasing the load on and torque delivered by the motor.

If the motor torque exceeds a predetermined value, that value being determined by resistor $R_{11}$, the operator of the apparatus would learn of the overload condition due to the light emitted by $LED_2$ and/or due to the action of relay $K_1$, which could be connected so as to turn off the motor, or to sound an alarm. In the latter case, the operator would be responsible for correcting the overload condition, by moving the brushes so as not to impinge so forcefully upon the printed circuit board.

Figure 5:
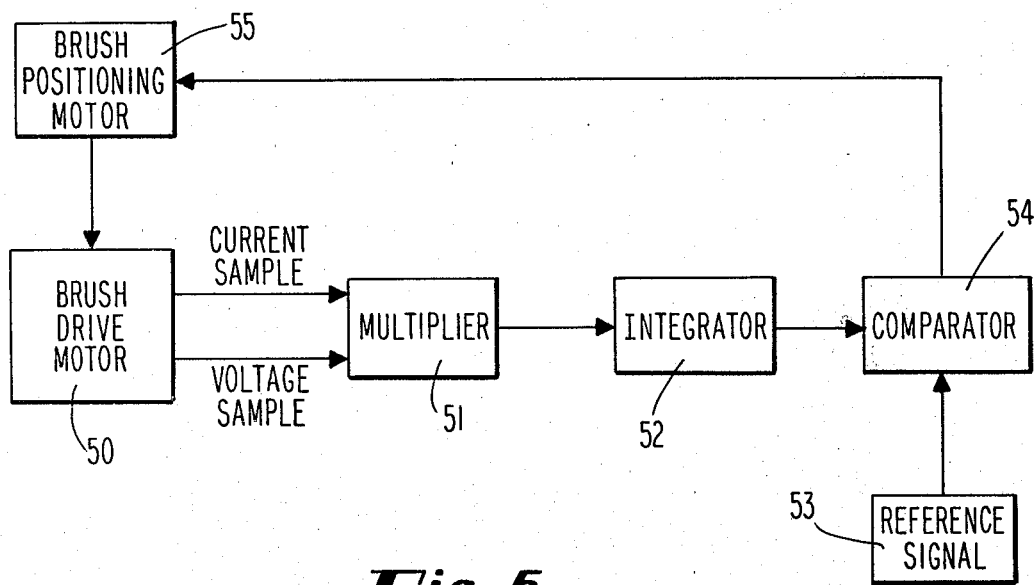
FIG. 5 is a block diagram of the servomechanism described in the present invention.

In the embodiment described above, the operator manually adjusts the position of the scrubbing brushes, in response to indications from the meter, by turning handles 40 and 41. In another embodiment of the present invention, illustrated in the block diagram of FIG. 5, a servomechanism performs the adjustment automatically. As shown in the diagram, a current sample and a voltage sample are taken from brush drive motor 50, and are multiplied together in multiplier 51, and then integrated in integrator 52. The output of integrator 52, together with reference signal 53, are fed into a comparator circuit 54. The reference signal 53 is a voltage which represents the desired motor torque. The comparator produces an output proportional to the difference between the actual motor torque and the desired torque, and this correction signal is fed to a brush positioning motor 55. The brush positioning motor is connected so as to rotate the threaded bars 30 and 31 of FIG. 1, thereby raising or lowering the scrubbing brushes relative to the printed circuit board. Although the drawings do not indicate the precise circuitry for the comparator and reference signal generator, or the brush positioning motor, it is understood that these are conventional elements, connected in a known manner.

In the above description of the present invention, circuitry has been shown only for one motor, despite the presence of two brush drive motors in FIG. 1. In practice, one set of circuits (FIGS. 2-4, or FIG. 5) could be used for each scrubbing brush. There would thus be as many meters to be monitored as there are brushes present.

It is now apparent that the apparatus disclosed herein is useful not only in scrubbing and deburring contexts, but in other applications as well. Indeed, the apparatus can be used to monitor and/or control the torque of any ac induction motor performing virtually any task. One example, taken from the printed circuit board art, is the control of a motor used to operate a pump for pumping etchant or rinse water. If the fluid being pumped is momentarily too viscous, the motor will be overloaded, and steps should be taken to reduce the load. An apparatus of the type disclosed could be used to indicate this condition of overload.

Many other modifications of the present invention are possible. The means for providing a warning signal for attainment of a predetermined torque can be varied, or omitted entirely. The precise number of brush motors and scrubbing brushes is not critical, as long as each brush is controlled in the manner taught by the present invention. The meter or indicator observed by the operator can be of analog, digital, bar step, or any other form. The ac induction motor can be of single or multphase configuration. The precise component values in the electronic circuitry may also be varied within reasonable tolerances. Also, the precise types of components can be modified (such as by switching from npn to pnp transistors). All such modifications are deemed to fall within the spirit and scope of the following claims.

What is claimed is:

1. Apparatus for brushing a substantially flat article comprising:
   means for conveying the article along a path,
   rotatable brush means, positioned to brush the article as the article travels along the path,
   alternating current motor means for rotating the brush means,
   electronic sensing means directly responsive to the resistive component of the current through the motor, the sensing means comprising means for monitoring and continuously measuring the torque of the motor, and
   means for moving the brush means towards or away from the article in response to output of the sensing means,
   wherein the sensing means comprises:
   means for sampling the current through, and the voltage across, the motor, the sampling means being electrically connected to the motor,
   means for multiplying the current and voltage measured by the sampling means, the multiplying means being electrically connected to the sampling means,
   means for integrating the output signal of the multiplying means, the integrating means being electrically connected to the multiplying means, and
   means, electrically connected to the integrating means, for indicating the value of the output of the integrating means.

2. The apparatus of claim 1, wherein the output of the multiplying means is coupled to the input of the integrating means by a light-emitting diode, the diode being positioned near a photosensitive field effect transistor, the diode being connected to the output of the multiplying means, and the field effect transistor being connected to the input of the integrating means.

3. The apparatus of claim 2, wherein the indicating means comprises a meter connected to the output of the integrating means, the meter being capable of indicating the torque of the motor.

4. The apparatus of claim 3, further comprising electronic means for signaling the attainment of a predetermined motor torque, the electronic signaling means being connected to the output of the integrating means.

5. The apparatus of claim 4, wherein the multiplying means and the integrating means are powered by separate power supplies.

6. The apparatus of claim 5, wherein the torque at which the signaling means produces a signal is continuously adjustable.

7. The apparatus of claim 6, wherein the signaling means is adapted to produce a signal by a light-emitting diode.

8. The apparatus of claim 6, wherein the signaling means is adapted to produce a signal by a relay.

9. The apparatus of claim 6, wherein the signaling means is adapted to produce a signal by both a light-emitting diode and a relay.

10. The apparatus of claim 9, wherein the sensing means comprises means for adjusting the sensitivity of the indicating means.

11. The apparatus of claim 10, wherein the indicating means comprises a meter.

12. The apparatus of claim 11, wherein the indicating means comprises means for zeroing the meter.

13. The apparatus of claim 1, wherein the moving means comprises a motor connected to move the brush means towards or away from the path.

14. The apparatus of claim 13, wherein the moving means is actuated by a signal from a comparator, the comparator signal being determined by the output of the integrating means and by a pre-set reference voltage.

15. Apparatus for use in a treatment system for the treatment of articles as part of an overall etching or other treatment operation, said apparatus comprising:
housing for substantially defining a treatment zone for treatment of articles being delivered therethrough,
inlet opening means for said housing, for receiving articles therethrough,
outlet opening means for delivering articles therefrom,
conveying means disposed in the housing for delivering articles along a path from said inlet means to said outlet means,
rotatable brush means disposed across said path and disposed to brush articles being conveyed along the path,
alternating current motor means for rotating the brush means,
electronic sensing means directly responsive substantially only to the resistive component of the current through the motor, the sensing means comprising means for monitoring and continuously measuring the torque of the motor, and
means for moving the brush means towards or away from the article in response to output of the sensing means,
wherein the sensing means comprises:
means for sampling the current through, and the voltage across, the motor, the sampling means being electrically connected to the motor,
means for multiplying the current and voltage measured by the sampling means, the multiplying means being electrically connected to the sampling means,
means for integrating the output signal of the multiplying means, the integrating means being electrically connected to the multiplying means, and
means, electrically connected to the integrating means, for indicating the value of the output of the integrating means.

16. The apparatus of claim 15, wherein the output of the multiplying means is coupled to the input of the integrating means by a light-emitting diode, the diode being positioned near a photosensitive field effect transistor, the diode being connected to the output of the multiplying means, and the field effect transistor being connected to the input of the integrating means.

17. The apparatus of claim 16, further comprising electronic means for signaling the attainment of a predetermined motor torque, the electronic signaling means being connected to the output of the integrating means.

18. The apparatus of claim 17, wherein the multiplying means and the integrating means are powered by separate power supplies.

19. The apparatus of claim 18, wherein the moving means comprises a motor connected to move the brush means towards or away from the path.

20. The apparatus of claim 19, wherein the moving means is actuated by a signal from a comparator, the comparator signal being determined by the output of the integrating means and by a pre-set reference voltage.

* * * * *